(12) United States Patent
Lee et al.

(10) Patent No.: US 9,397,791 B2
(45) Date of Patent: *Jul. 19, 2016

(54) TRANSMITTING DATA IN A MOBILE COMMUNICATION SYSTEM

(71) Applicant: LG ELECTRONICS INC., Seoul (KR)

(72) Inventors: Young Dae Lee, Hanam-si (KR); Sung Duck Chun, Anyang-si (KR); Myung Cheul Jung, Seoul (KR); Sung Jun Park, Gunpo-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/681,771

(22) Filed: Apr. 8, 2015

(65) Prior Publication Data

US 2015/0215076 A1   Jul. 30, 2015

Related U.S. Application Data

(63) Continuation of application No. 14/483,940, filed on Sep. 11, 2014, now Pat. No. 9,036,596, which is a continuation of application No. 13/677,232, filed on Nov. 14, 2012, now Pat. No. 8,867,449, which is a (Continued)

(30) Foreign Application Priority Data

Nov. 1, 2006   (KR) .................. 10-2006-0107103

(51) Int. Cl.
*H04L 1/16*   (2006.01)
*H04L 12/801*   (2013.01)
(Continued)

(52) U.S. Cl.
CPC ............ *H04L 1/1621* (2013.01); *H04L 1/1825* (2013.01); *H04L 1/1887* (2013.01);
(Continued)

(58) Field of Classification Search
CPC .... H04L 1/1621; H04L 47/34; H04W 28/065
See application file for complete search history.

(56) References Cited

U.S. PATENT DOCUMENTS 5,659,756 A   8/1997 Hefferon et al.
5,828,677 A   10/1998 Sayeed et al.
(Continued)

FOREIGN PATENT DOCUMENTS

CN   1104402   6/1995
CN   1267146   9/2000
(Continued)

OTHER PUBLICATIONS

U.S. Appl. No. 12/159,849 Office Action dated Apr. 10, 2015, 11 pages.
(Continued)

*Primary Examiner* — Brian D Nguyen
(74) *Attorney, Agent, or Firm* — Lee, Hong, Degerman, Kang & Walmey; Jonathan Kang; Michael Monaco

(57) ABSTRACT

According to one embodiment, a method for retransmitting a protocol data unit (PDU) in a mobile communication system includes: segmenting a first PDU to form one or more second PDUs if the first PDU does not fit within a PDU size indicated by a lower layer; and transmitting the one or more second PDUs to a receiving side. Segmenting the first PDU includes: mapping only a data field of the first PDU to a data field of the one or more second PDUs; and setting a header of each of the one or more second PDUs. The header of each of the one or more second PDUs includes a field indicating a sequence number of the first PDU.

10 Claims, 8 Drawing Sheets

Related U.S. Application Data continuation of application No. 12/797,576, filed on Jun. 9, 2010, now Pat. No. 8,340,026, which is a continuation of application No. 12/159,982, filed as application No. PCT/KR2007/000053 on Jan. 4, 2007, now Pat. No. 8,428,086.

(60) Provisional application No. 60/757,063, filed on Jan. 5, 2006, provisional application No. 60/771,305, filed on Feb. 7, 2006, provisional application No. 60/784,976, filed on Mar. 22, 2006, provisional application No. 60/815,722, filed on Jun. 21, 2006.

(51) Int. Cl.
    *H04W 28/06*     (2009.01)
    *H04L 1/18*     (2006.01)
    *H04L 29/06*     (2006.01)
    *H04W 28/04*     (2009.01)

(52) U.S. Cl.
    CPC .............. *H04L1/1893* (2013.01); *H04L 47/10* (2013.01); *H04L 47/18* (2013.01); *H04L 47/34* (2013.01); *H04L 69/22* (2013.01); *H04W 28/065* (2013.01); *H04W 28/04* (2013.01)

(56) References Cited

U.S. PATENT DOCUMENTS

| | | |
|---|---|---|
| 6,088,342 A | 7/2000 | Cheng et al. |
| 6,138,158 A | 10/2000 | Boyle et al. |
| 6,317,430 B1 | 11/2001 | Knisely et al. |
| 6,330,448 B1 | 12/2001 | Otsuka et al. |
| 6,381,229 B1 | 4/2002 | Narvinger et al. |
| 6,480,525 B1 | 11/2002 | Parsa et al. |
| 6,571,102 B1 | 5/2003 | Hogberg et al. |
| 6,597,668 B1 | 7/2003 | Schafer et al. |
| 6,597,675 B1 | 7/2003 | Esmailzadeh et al. |
| 6,694,148 B1 | 2/2004 | Frodigh et al. |
| 6,717,925 B1 | 4/2004 | Leppisaari et al. |
| 6,728,225 B1 | 4/2004 | Ozluturk |
| 6,785,510 B2 | 8/2004 | Larsen |
| 6,791,963 B1 | 9/2004 | Hwang et al. |
| 6,795,412 B1 | 9/2004 | Lee |
| 6,850,504 B1 | 2/2005 | Cao et al. |
| 6,859,445 B1 | 2/2005 | Moon et al. |
| 6,882,727 B1 | 4/2005 | Vialen et al. |
| 6,907,005 B1 | 6/2005 | Dahlman et al. |
| 6,907,015 B1 | 6/2005 | Moulsley et al. |
| 6,934,550 B2 | 8/2005 | Kearney et al. |
| 6,947,394 B1 | 9/2005 | Johansson et al. |
| 6,950,420 B2 | 9/2005 | Sarkkinen et al. |
| 6,965,580 B1 | 11/2005 | Takagi et al. |
| 7,016,343 B1 | 3/2006 | Mermel et al. |
| 7,031,708 B2 | 4/2006 | Sarkkinen et al. |
| 7,054,298 B1 | 5/2006 | Kim et al. |
| 7,075,971 B2 | 7/2006 | Parsa et al. |
| 7,099,309 B2 | 8/2006 | Davidson |
| 7,145,895 B2 | 12/2006 | Mueckenheim et al. |
| 7,151,758 B2 | 12/2006 | Kumaki et al. |
| RE39,454 E | 1/2007 | Cantoni et al. |
| 7,184,792 B2 | 2/2007 | Mir |
| 7,239,870 B2 | 7/2007 | Zhang et al. |
| 7,359,345 B2 | 4/2008 | Chang et al. |
| 7,359,349 B2 | 4/2008 | Kayama et al. |
| 7,376,424 B2 | 5/2008 | Kim et al. |
| 7,385,952 B2 | 6/2008 | Mantha et al. |
| 7,398,108 B2 | 7/2008 | Hondo |
| 7,426,175 B2 | 9/2008 | Zhuang et al. |
| 7,430,206 B2 | 9/2008 | Terry et al. |
| 7,436,801 B1 | 10/2008 | Kanterakis |
| 7,443,816 B2 | 10/2008 | Chen et al. |
| 7,496,113 B2 | 2/2009 | Cai et al. |
| 7,535,886 B2 | 5/2009 | Lee et al. |
| 7,590,089 B2 | 9/2009 | Park et al. |
| 7,664,059 B2 | 2/2010 | Jiang |
| 7,729,719 B2 | 6/2010 | Bergstrom et al. |
| 7,826,859 B2 | 11/2010 | Lee et al. |
| 7,848,308 B2 | 12/2010 | Lee et al. |
| 8,031,668 B2 | 10/2011 | Wang et al. |
| 8,036,110 B2 | 10/2011 | Ishii et al. |
| 8,068,511 B2 | 11/2011 | Reznik et al. |
| 8,090,382 B2 | 1/2012 | Park et al. |
| 8,098,644 B2 | 1/2012 | Xiao et al. |
| 2001/0024956 A1 | 9/2001 | You et al. |
| 2001/0046864 A1 | 11/2001 | Bhatoolaul et al. |
| 2002/0009067 A1 | 1/2002 | Sachs et al. |
| 2002/0009129 A1 | 1/2002 | Choi et al. |
| 2002/0021698 A1 | 2/2002 | Lee et al. |
| 2002/0021714 A1 | 2/2002 | Seguin |
| 2002/0028690 A1 | 3/2002 | McKenna et al. |
| 2002/0032884 A1 | 3/2002 | Kobata et al. |
| 2002/0044527 A1 | 4/2002 | Jiang et al. |
| 2002/0071480 A1 | 6/2002 | Marjelund et al. |
| 2002/0080887 A1 | 6/2002 | Jeong et al. |
| 2002/0090004 A1 | 7/2002 | Rinchiuso |
| 2002/0093940 A1 | 7/2002 | Toskala et al. |
| 2002/0116515 A1 | 8/2002 | Hashimoto |
| 2002/0126629 A1 | 9/2002 | Jiang et al. |
| 2002/0131375 A1 | 9/2002 | Vogel et al. |
| 2002/0160744 A1 | 10/2002 | Choi et al. |
| 2002/0181436 A1 | 12/2002 | Mueckenheim et al. |
| 2002/0187789 A1 | 12/2002 | Diachina et al. |
| 2002/0191559 A1 | 12/2002 | Chen et al. |
| 2003/0003920 A1 | 1/2003 | Sebastian |
| 2003/0007510 A1 | 1/2003 | Yeo et al. |
| 2003/0016672 A1 | 1/2003 | Rosen et al. |
| 2003/0031119 A1 | 2/2003 | Kim et al. |
| 2003/0035440 A1 | 2/2003 | Casaccia et al. |
| 2003/0043741 A1 | 3/2003 | Mukai et al. |
| 2003/0050097 A1 | 3/2003 | Amirijoo et al. |
| 2003/0054829 A1 | 3/2003 | Moisio |
| 2003/0076812 A1 | 4/2003 | Benedittis |
| 2003/0078046 A1 | 4/2003 | Seo |
| 2003/0084185 A1 | 5/2003 | Pinkerton |
| 2003/0099305 A1 | 5/2003 | Yi et al. |
| 2003/0103476 A1 | 6/2003 | Choi et al. |
| 2003/0131124 A1 | 7/2003 | Yi et al. |
| 2003/0137931 A1 | 7/2003 | Hans et al. |
| 2003/0139170 A1 | 7/2003 | Heo |
| 2003/0147371 A1 | 8/2003 | Choi et al. |
| 2003/0156624 A1 | 8/2003 | Koslar |
| 2003/0210669 A1 | 11/2003 | Vayanos et al. |
| 2003/0223393 A1 | 12/2003 | Lee |
| 2003/0236085 A1 | 12/2003 | Ho |
| 2004/0001452 A1 | 1/2004 | Day et al. |
| 2004/0002334 A1 | 1/2004 | Lee et al. |
| 2004/0004954 A1 | 1/2004 | Terry et al. |
| 2004/0006643 A1 | 1/2004 | Dolson et al. |
| 2004/0008658 A1 | 1/2004 | Dahlman et al. |
| 2004/0008659 A1 | 1/2004 | Kim |
| 2004/0014452 A1 | 1/2004 | Lim et al. |
| 2004/0028078 A1 | 2/2004 | Beckmann et al. |
| 2004/0057387 A1 | 3/2004 | Yi et al. |
| 2004/0062267 A1* | 4/2004 | Minami et al. ................. 370/463 |
| 2004/0077357 A1 | 4/2004 | Nakada |
| 2004/0097192 A1 | 5/2004 | Schiff |
| 2004/0103435 A1 | 5/2004 | Yi et al. |
| 2004/0114593 A1 | 6/2004 | Dick et al. |
| 2004/0114606 A1 | 6/2004 | Haddad |
| 2004/0116143 A1 | 6/2004 | Love et al. |
| 2004/0117860 A1 | 6/2004 | Yi et al. |
| 2004/0125772 A9 | 7/2004 | Wu et al. |
| 2004/0127223 A1 | 7/2004 | Li et al. |
| 2004/0143676 A1 | 7/2004 | Baudry et al. |
| 2004/0144593 A1 | 7/2004 | Shai |
| 2004/0146019 A1 | 7/2004 | Kim et al. |
| 2004/0147266 A1 | 7/2004 | Hwang et al. |
| 2004/0147271 A1 | 7/2004 | Billon et al. |
| 2004/0157602 A1 | 8/2004 | Khawand |
| 2004/0171395 A1 | 9/2004 | Shin |
| 2004/0176094 A1 | 9/2004 | Kim et al. |
| 2004/0180675 A1 | 9/2004 | Choi et al. |
| 2004/0184437 A1 | 9/2004 | Lee et al. |

(56) References Cited

U.S. PATENT DOCUMENTS

| | | |
|---|---|---|
| 2004/0185860 A1 | 9/2004 | Marjelund et al. |
| 2004/0196861 A1 | 10/2004 | Rinchiuso et al. |
| 2004/0198369 A1 | 10/2004 | Kwak et al. |
| 2004/0202140 A1 | 10/2004 | Kim et al. |
| 2004/0208160 A1 | 10/2004 | Petrovic et al. |
| 2004/0229626 A1 | 11/2004 | Yi et al. |
| 2004/0248600 A1 | 12/2004 | Kim |
| 2004/0264497 A1 | 12/2004 | Wang et al. |
| 2004/0264550 A1 | 12/2004 | Dabak |
| 2004/0266494 A1 | 12/2004 | Ruuska et al. |
| 2005/0008035 A1 | 1/2005 | Eklund et al. |
| 2005/0014508 A1 | 1/2005 | Moulsley et al. |
| 2005/0020260 A1 | 1/2005 | Jeong et al. |
| 2005/0025039 A1 | 2/2005 | Hwang et al. |
| 2005/0026623 A1 | 2/2005 | Fisher |
| 2005/0039101 A1 | 2/2005 | Torsner |
| 2005/0041573 A1 | 2/2005 | Eom et al. |
| 2005/0054368 A1 | 3/2005 | Amerga |
| 2005/0059407 A1 | 3/2005 | Reed et al. |
| 2005/0059421 A1 | 3/2005 | Reed et al. |
| 2005/0063336 A1 | 3/2005 | Kim et al. |
| 2005/0073987 A1 | 4/2005 | Wu |
| 2005/0105482 A1 | 5/2005 | Kobayashi et al. |
| 2005/0105488 A1 | 5/2005 | Raji et al. |
| 2005/0107036 A1 | 5/2005 | Song et al. |
| 2005/0111393 A1 | 5/2005 | Jeong et al. |
| 2005/0114489 A1 | 5/2005 | Yonge et al. |
| 2005/0118947 A1 | 6/2005 | Ames et al. |
| 2005/0129058 A1 | 6/2005 | Casaccia et al. |
| 2005/0135416 A1 | 6/2005 | Ketchum et al. |
| 2005/0157696 A1 | 7/2005 | Yamamoto |
| 2005/0176474 A1 | 8/2005 | Lee et al. |
| 2005/0185608 A1 | 8/2005 | Lee et al. |
| 2005/0190728 A1 | 9/2005 | Han et al. |
| 2005/0195732 A1 | 9/2005 | Huh et al. |
| 2005/0197134 A1 | 9/2005 | McKenna et al. |
| 2005/0201474 A1 | 9/2005 | Cho et al. |
| 2005/0207374 A1 | 9/2005 | Petrovic et al. |
| 2005/0213605 A1 | 9/2005 | Kim et al. |
| 2005/0238027 A1* | 10/2005 | Skarpness et al. ......... 370/395.6 |
| 2005/0243767 A1 | 11/2005 | Zhang et al. |
| 2005/0249141 A1 | 11/2005 | Lee et al. |
| 2005/0249222 A1 | 11/2005 | van Kampen et al. |
| 2005/0260997 A1 | 11/2005 | Korale et al. |
| 2005/0265301 A1 | 12/2005 | Heo et al. |
| 2005/0265353 A1* | 12/2005 | Sengupta et al. ......... 370/395.52 |
| 2005/0271025 A1 | 12/2005 | Guethaus et al. |
| 2005/0281212 A1 | 12/2005 | Jeong et al. |
| 2005/0281222 A1 | 12/2005 | Ranta-Aho et al. |
| 2005/0288026 A1 | 12/2005 | Byun et al. |
| 2006/0002367 A1 | 1/2006 | Lee et al. |
| 2006/0007886 A1 | 1/2006 | Lee et al. |
| 2006/0011953 A1 | 1/2006 | Nakahashi et al. |
| 2006/0025079 A1 | 2/2006 | Sutskover et al. |
| 2006/0030342 A1 | 2/2006 | Hwang et al. |
| 2006/0034175 A1 | 2/2006 | Herrmann |
| 2006/0045047 A1 | 3/2006 | Choi et al. |
| 2006/0050679 A1 | 3/2006 | Jiang |
| 2006/0050739 A1* | 3/2006 | Narad et al. .................. 370/476 |
| 2006/0056347 A1 | 3/2006 | Kwak et al. |
| 2006/0059186 A1 | 3/2006 | Backlund |
| 2006/0062196 A1 | 3/2006 | Cai et al. |
| 2006/0062312 A1 | 3/2006 | Lee et al. |
| 2006/0072494 A1 | 4/2006 | Matusz |
| 2006/0077892 A1 | 4/2006 | Jiang |
| 2006/0083183 A1 | 4/2006 | Teague et al. |
| 2006/0088009 A1 | 4/2006 | Gibbs et al. |
| 2006/0095567 A1* | 5/2006 | Biran et al. .................. 709/224 |
| 2006/0120403 A1 | 6/2006 | Murata et al. |
| 2006/0126541 A1* | 6/2006 | Park .............................. 370/300 |
| 2006/0133422 A1* | 6/2006 | Maughan et al. ............. 370/474 |
| 2006/0143300 A1 | 6/2006 | See et al. |
| 2006/0146745 A1 | 7/2006 | Cai et al. |
| 2006/0146751 A1 | 7/2006 | Obuchi et al. |
| 2006/0153232 A1 | 7/2006 | Shvodian |
| 2006/0154680 A1 | 7/2006 | Kroth et al. |
| 2006/0156370 A1 | 7/2006 | Parantainen |
| 2006/0159102 A1 | 7/2006 | Major |
| 2006/0168343 A1 | 7/2006 | Ma et al. |
| 2006/0193282 A1 | 8/2006 | Ikawa et al. |
| 2006/0256818 A1 | 11/2006 | Shvodian et al. |
| 2006/0292982 A1 | 12/2006 | Ye et al. |
| 2007/0076680 A1 | 4/2007 | Amram et al. |
| 2007/0081483 A1 | 4/2007 | Jang et al. |
| 2007/0081513 A1 | 4/2007 | Torsner |
| 2007/0098006 A1 | 5/2007 | Parry et al. |
| 2007/0098115 A1 | 5/2007 | Bachl et al. |
| 2007/0099619 A1 | 5/2007 | Parekh et al. |
| 2007/0104151 A1 | 5/2007 | Papasakellariou et al. |
| 2007/0110101 A1 | 5/2007 | Wu |
| 2007/0117579 A1 | 5/2007 | Cai et al. |
| 2007/0135080 A1 | 6/2007 | Islam et al. |
| 2007/0140115 A1 | 6/2007 | Bienas et al. |
| 2007/0147315 A1 | 6/2007 | Khoury et al. |
| 2007/0147326 A1 | 6/2007 | Chen |
| 2007/0149206 A1 | 6/2007 | Wang et al. |
| 2007/0191054 A1 | 8/2007 | Das et al. |
| 2007/0206531 A1 | 9/2007 | Pajukoski et al. |
| 2007/0218930 A1 | 9/2007 | Kuo |
| 2007/0254595 A1 | 11/2007 | Yoon et al. |
| 2007/0254662 A1 | 11/2007 | Khan et al. |
| 2007/0274253 A1 | 11/2007 | Zhang et al. |
| 2008/0031253 A1 | 2/2008 | Kim et al. |
| 2008/0069031 A1 | 3/2008 | Zhang et al. |
| 2008/0076359 A1 | 3/2008 | Charpentier et al. |
| 2008/0095105 A1 | 4/2008 | Sundberg et al. |
| 2008/0130643 A1 | 6/2008 | Jain et al. |
| 2008/0137564 A1 | 6/2008 | Herrmann |
| 2008/0212541 A1 | 9/2008 | Vayanos et al. |
| 2008/0232291 A1 | 9/2008 | Hus et al. |
| 2008/0267136 A1 | 10/2008 | Baker et al. |
| 2009/0052388 A1 | 2/2009 | Kim et al. |
| 2009/0109912 A1 | 4/2009 | DiGirolamo et al. |
| 2009/0163211 A1 | 6/2009 | Kitazoe et al. |
| 2009/0175241 A1 | 7/2009 | Ohta et al. |
| 2009/0185477 A1 | 7/2009 | Lee et al. |
| 2009/0201948 A1 | 8/2009 | Patwardhan et al. |
| 2009/0238141 A1 | 9/2009 | Damnjanovic et al. |
| 2009/0319850 A1 | 12/2009 | Baek et al. |
| 2009/0323624 A1 | 12/2009 | Kim |
| 2010/0014430 A1 | 1/2010 | Oka |
| 2010/0034095 A1 | 2/2010 | Ho et al. |
| 2010/0103899 A1 | 4/2010 | Kwak et al. |
| 2010/0105334 A1 | 4/2010 | Terry et al. |
| 2011/0038376 A1 | 2/2011 | Wiemann et al. |
| 2013/0070681 A1 | 3/2013 | Lee et al. |
| 2015/0029985 A1 | 1/2015 | Lee et al. |

FOREIGN PATENT DOCUMENTS

| | | |
|---|---|---|
| CN | 1315121 | 9/2001 |
| CN | 1346191 | 4/2002 |
| CN | 1383626 | 12/2002 |
| CN | 1411668 | 4/2003 |
| CN | 1430359 | 7/2003 |
| CN | 1476267 | 2/2004 |
| CN | 1565140 | 1/2005 |
| CN | 1649285 | 8/2005 |
| CN | 1663158 | 8/2005 |
| CN | 1692661 | 11/2005 |
| DE | 10337828 | 4/2005 |
| EP | 0978958 | 2/2000 |
| EP | 1009184 | 6/2000 |
| EP | 1041850 | 10/2000 |
| EP | 1261222 | 11/2002 |
| EP | 1361514 | 11/2003 |
| EP | 1392074 | 2/2004 |
| EP | 1441473 | 7/2004 |
| EP | 1478203 | 11/2004 |
| EP | 1557968 | 7/2005 |
| EP | 1599063 | 11/2005 |
| EP | 1496639 | 12/2005 |
| EP | 1605724 | 12/2005 |
| EP | 1684538 | 7/2006 |

(56) References Cited

FOREIGN PATENT DOCUMENTS

| | | |
|---|---|---|
| EP | 1757135 | 2/2007 |
| JP | 6-013959 | 1/1994 |
| JP | 06-121001 | 4/1994 |
| JP | 9-055693 | 2/1997 |
| JP | 1997-186704 | 7/1997 |
| JP | 9-327072 | 12/1997 |
| JP | 11-177621 | 7/1999 |
| JP | 11-215192 | 8/1999 |
| JP | 11-308671 | 11/1999 |
| JP | 2000-032088 | 1/2000 |
| JP | 2000-151494 | 5/2000 |
| JP | 2000-175271 | 6/2000 |
| JP | 2000-184428 | 6/2000 |
| JP | 2001-95031 | 4/2001 |
| JP | 2001-298770 | 10/2001 |
| JP | 2002064589 | 2/2002 |
| JP | 2002-374321 | 12/2002 |
| JP | 2003-008635 | 1/2003 |
| JP | 2003078480 | 3/2003 |
| JP | 2003-116172 | 4/2003 |
| JP | 2003174470 | 6/2003 |
| JP | 2003333661 | 11/2003 |
| JP | 2004-128967 | 4/2004 |
| JP | 2004-320165 | 11/2004 |
| JP | 2004312771 | 11/2004 |
| JP | 2004-349884 | 12/2004 |
| JP | 2005-517369 | 6/2005 |
| JP | 2005217743 | 8/2005 |
| JP | 2005-236988 | 9/2005 |
| JP | 2005-237013 | 9/2005 |
| JP | 2005-244958 | 9/2005 |
| JP | 2005278167 | 10/2005 |
| JP | 2005-536168 | 11/2005 |
| JP | 2005-539462 | 12/2005 |
| JP | 2006-14372 | 1/2006 |
| JP | 2006-020044 | 1/2006 |
| JP | 2006025437 | 1/2006 |
| JP | 2006-505998 | 2/2006 |
| JP | 2006352705 | 12/2006 |
| JP | 2009-284532 | 12/2009 |
| KR | 1020010111634 | 12/2001 |
| KR | 1020010111637 | 12/2001 |
| KR | 1020040048675 | 6/2004 |
| KR | 10-2004-0058638 | 7/2004 |
| KR | 1020040064867 | 7/2004 |
| KR | 1020040089937 | 10/2004 |
| KR | 1020050029395 | 3/2005 |
| KR | 1020050122979 | 12/2005 |
| KR | 1020060016436 | 2/2006 |
| KR | 1020060040367 | 5/2006 |
| RU | 2168278 | 5/2001 |
| RU | 2191479 | 10/2002 |
| RU | 2232469 | 7/2004 |
| RU | 2237380 | 9/2004 |
| RU | 2232477 | 10/2004 |
| RU | 2263415 | 10/2005 |
| RU | 2270526 | 2/2006 |
| RU | 2009106289 | 8/2010 |
| TW | 407407 | 10/2000 |
| TW | 548916 | 8/2003 |
| TW | 552815 | 9/2003 |
| TW | 586283 | 5/2004 |
| TW | 589818 | 6/2004 |
| TW | 590340 | 6/2004 |
| TW | 592412 | 6/2004 |
| TW | I228008 | 2/2005 |
| TW | I229268 | 3/2005 |
| TW | I229514 | 3/2005 |
| TW | 200522579 | 7/2005 |
| TW | I237478 | 8/2005 |
| TW | I239731 | 9/2005 |
| TW | I239756 | 9/2005 |
| TW | 200536318 | 11/2005 |
| TW | I242951 | 11/2005 |
| TW | 2005-41258 | 12/2005 |
| TW | M283441 | 12/2005 |
| TW | 2006-01727 | 1/2006 |
| TW | 200605549 | 2/2006 |
| TW | I253824 | 4/2006 |
| WO | 94/09597 | 4/1994 |
| WO | 98/47302 | 10/1998 |
| WO | 98/49857 | 11/1998 |
| WO | 9944383 | 9/1999 |
| WO | 9960729 | 11/1999 |
| WO | 99/63713 | 12/1999 |
| WO | 99/063713 | 12/1999 |
| WO | 00/14989 | 3/2000 |
| WO | 00/21320 | 4/2000 |
| WO | 01/05068 | 1/2001 |
| WO | 01/05121 | 1/2001 |
| WO | 01/35586 | 5/2001 |
| WO | 0203720 | 1/2002 |
| WO | 02/039697 | 5/2002 |
| WO | 02/39760 | 5/2002 |
| WO | 2002/43403 | 5/2002 |
| WO | 02/47417 | 6/2002 |
| WO | 02-075442 | 9/2002 |
| WO | 2002-075442 | 9/2002 |
| WO | 02-102110 | 12/2002 |
| WO | 03/007636 | 1/2003 |
| WO | 03/017691 | 2/2003 |
| WO | 2003/017691 | 2/2003 |
| WO | 03/043259 | 5/2003 |
| WO | 2003/043259 | 5/2003 |
| WO | 03/047155 | 6/2003 |
| WO | 03/055142 | 7/2003 |
| WO | 03/056723 | 7/2003 |
| WO | 03/087978 | 10/2003 |
| WO | 03/096571 | 11/2003 |
| WO | 2004/030393 | 4/2004 |
| WO | 2004/034656 | 4/2004 |
| WO | 2004045234 | 5/2004 |
| WO | 2004/075442 | 9/2004 |
| WO | 2004/079971 | 9/2004 |
| WO | 2004-089030 | 10/2004 |
| WO | 2004/091130 | 10/2004 |
| WO | 2005/006660 | 1/2005 |
| WO | 2005/018269 | 2/2005 |
| WO | 2005/034418 | 4/2005 |
| WO | 2005/036917 | 4/2005 |
| WO | 2005055472 | 6/2005 |
| WO | 2005/071887 | 8/2005 |
| WO | 2005/074312 | 8/2005 |
| WO | 2005/088886 | 9/2005 |
| WO | 2005-099125 | 10/2005 |
| WO | 2005/109695 | 11/2005 |
| WO | 2005/109837 | 11/2005 |
| WO | 2005/19941 | 12/2005 |
| WO | 2005/114884 | 12/2005 |
| WO | 2005/117317 | 12/2005 |
| WO | 2005-125125 | 12/2005 |
| WO | 2005119941 | 12/2005 |
| WO | 2006/012946 | 2/2006 |
| WO | 2007/095966 | 8/2007 |

OTHER PUBLICATIONS

U.S. Appl. No. 12/159,849, Office Action dated Sep. 16, 2014, 8 pages.
Intellectual Property Office of India Application Serial No. 3868/KOLNP/2008, Office Action dated Aug. 18, 2014, 2 pages.
The State Intellectual Property Office of the People's Republic of China Application U.S. Appl. No. 201110399482.9, Office Action dated Aug. 21, 2013, 6 pages.
LG Electronics Inc.: "Framing in the MAC Entity", 3GPP TSG-RAN WG2, R2-061012 [on-line], Mar. 27, 2006; Retrieved from the internet.
LG Electronics Inc.: "HARQ and ARQ Operation", 3GPP TSG-RAN WG2, R2-060106 Jan. 9, 2006; Retrieved from the internet.
3rd Generation Partnership Project (3GPP), "Technical Specification Group Radio Access Network; Introduction of the Multimedia Broadcast Multicast Service (MBMS) in the Radio Access Network (RAN); Stage 2 (Release 6)," 3GPP TS 25.346 V6.7.0, Dec. 2005.

(56) References Cited

OTHER PUBLICATIONS

China Mobile, "RRC States Analysis in LTE," 3GPP TSG RAN WG2#48, R2-052140, Aug. 29, 2005.
Panasonic, "E-UTRA Transport and Logical Channels," 3GPP TSG RAN WG2#49, R2-052860, Nov. 7, 2005.
Siemens, "States in E-UTRAN," 3GPP TSG-RAN WG RAN2#48, R2-052501, Aug. 29, 2005.
QUALCOMM Europe, "Signaling Optimization for E-UTRAN," 3GPP TSG-RAN WG2 Meeting #48-bis, R2-052407, Oct. 10, 2005.
Motorola et al., "MAC-e/es header and functional split," R2-042360, 3GPP TSG RAN WG2 Meeting#45, Nov. 2004.
Ericsson, "User plane protocol enhancements," R2-052749, TSG-RAN WG2 Meeting #48bis, Oct. 2005.
LG Electronics Inc., "MAC Enhancement," R2-060561, 3GPP TSG-RAN WG2 #51, Feb. 2006.
Qualcomm, "Need for MAC-hs segmentation mechanism," R2-020769, 3GPP TSG-RAN WG2 Meeting #28, Apr. 2002.
3rd Generation Partnership Project (3GPP), "LTE; Evolved Universal Terrestrial Radio Access (E-UTRA) Medium Access Control (MAC) Protocol Specification (Release 8)," 3GPP TS 36.321 v8.4.0, Jan. 2009.
QUALCOMM, "Need for MAC-hs segmentation mechanism," 3GPP TSG-RAN WG2 meeting #28, R2-020769, Apr. 2002.
Ericsson, "Solution for sending NAS together with RRC connection request," R2-071817, 3GPP TSG-RAN WG2#58, May 2007.
LG Electronics Inc., "Default SRB for initial access," R2-061958, 3GPP TSG-RAN WG2 LTE Ad-hoc, Jun. 2006.
Motorola, Inc., "Technical Overview of 1xEV-DV," Version: G1.4, Sep. 2002, 24 pages.
U.S. Appl. No. 13/840,738, Office Action dated May 18, 2015, 9 pages.
Xu, H., et al.; "Performance Analysis on the Radio Link Control Protocol of UMTS System"; 2002 IEEE 56th Vehicular Technology Conference Proceedings; pp. 2026-2030; Sep. 2002.
3rd Generation Partnership Project (3GPP), "Universal Mobile Telecommunications System (UMTS); Radio Resource Control (RRC) protocol specification (3GPP TS 25.331 version 6.8.0 Release 6)," ETSI TS 125 331, Dec. 2005.
Haardt, M., et al., "The TD-CDMA Based UTRA TDD Mode," IEEE Journal on Selected Areas in Communications, vol. 18, No. 8, pp. 1375-85, Aug. 2000.
IPwireless, "Layer 2 functions for LTE", Tdoc R2-052377, 3GPP TSG-RAN WG2 #48bis, Oct. 2005, XP-050129489.
LG Electronics Inc., "MAC Architecture of LTE", R2-060105, 3GPP TSG-RAN WG2 #50, Jan. 2006, XP-050130258.
LG Electronics Inc., "Discussion on RLC PDU Structure", R2-070721, 3GPP TSG-RAN WG2 #57, Feb. 2007, XP-050133754.
LG Electronics Inc., "HARQ and ARQ Operation", R2-060563, 3GPP TSG-RAN WG2 #51, Feb. 2006, XP-050130522.
Ericsson: "E-UTRA Random Access", 3GPP TSG-RAN WG1, R1-051445 [online], Nov. 7, 2005 [retrieved on Oct. 23, 2008], XP003020958. Retrieved fro the Internet: <URL:http://www.3gpp.org/ftp/tsg_ran/WG1_RL1/TSGR1_43/Docs/R1-051445.zip> section 2.
Zdarsky, Frank A. et al., "Handover in Mobile Communication Networks: Who is in control anyway?", Proceedings of the 30th EUROMICRO Conference, Aug. 31, 2004, XP10723593. pp. 205-212.
Huawei "Further considerations on multiplexing method of shared Control Channel in Uplink Single-Carrier FDMA" TSG-RAN WG1 #43, Nov. 7-11, 2005.
Fujitsu, et al. "Multiplexing method of shared control channel in uplink single-carrier FDMA radio access" TSG-RAN WG1 #42bis, Oct. 10-14, 2005.
Motorola: "Paging Channel Design for E-UTRA", 3GPP TSG-RAN WG1,R1-061712 [online] Jun. 27, 2006.
Sarka, S. et al.: Common-Channel Soft Handoff in cdma2000—The Paging Channel. IEEE Transactions on Microwave Theory and Techniques. Jun. 2000.
NTT DOCOMO, et al.: "Paging Channel Structure for E-UTRA Downlink", 3GPP TSG-RAN WG1, R1-060034 [online], Jan. 23, 2006.

Phillips: "Envolved Paging Indicators for LTE": 3GPP TSG-RAN WG2 Meeting #49, Seoul, Korea, Nov. 7-11, 2005.
Derryberry R T et al.: "On CDMA 2000 evolution-Reverse high-speed packet data physical layer enhancements in CDMA 2000 1xEV-DV."; IEEE Communications Magazine, Apr. 1, 2005.
Chung J. et al., "Packet synchronization and identification for incremental redundancy transmission in FH-CDMA systems" Third IEEE International Symposium on Personal, Indoor and Mobile Radio Communications, Boston, MA, USA, Oct. 21, 1992.
Ericsson: "E-UTRA Random Access", 3GPP TSG-RAN WG1, R1-051445 [online], Nov. 7, 2005, XP003020958.
Zdarsky, Frank A. et al., "Handover in Mobile Communication Networks: Who is in control anyway?", Proceedings of the 30th EUROMICRO Conference, Aug. 31, 2004, XP10723593. pp. 205-12.
IPwireless, "Layer 2 functions for LTE", R2-052377, 3GPP TSG RAN WG2 #48bis, Oct. 2005, XP-050129489.
Ericsson: "E-UTRA Random Access", 3GPP TSG-RAN WG1, R1-051445, Nov. 7, 2005, XP003020958.
LG Electronics, Inc.; "Framing in the MAC Entity", 3GPP TSG-RAN WG2, R2-061012, Mar. 27, 2006.
LG Electronics, Inc.; "HARQ and ARQ Operation", 3GPP TSG-RAN WG2, R2-060106, Jan. 9, 2006.
Huawei "Further considerations on multiplexing method of shared Control Channel in Uplink Single-Carrier FDMA" TSG-RAN WG1 #43, Nov. 7, 2005.
Fujitsu, et al. "Multiplexing method of shared control channel in uplink single-carrier FDMA radio access" TSG-RAN WG1 #42bis, Oct. 10, 2005.
Motorola: "Paging Channel Design for E-UTRA", 3GPP TSG-RAN WG1,R1-061712, Jun. 27, 2006.
Sarka, S. et al.; "Common-Channel Soft Handoff in cdma2000—The Paging Channel," IEEE Transactions on Microwave Theory and Techniques, Jun. 2000.
NTT Docomo, et al.: "Paging Channel Structure for E-UTRA Downlink", 3GPP TSG-RAN WG1, R1-060034, Jan. 23, 2006.
Phillips; "Envolved Paging Indicators for LTE"; 3GPP TSG-RAN WG2 Meeting #49, Nov. 7, 2005.
Derryberry R T et al.; "On CDMA 2000 evolution-Reverse high-speed packet data physical layer enhancements in CDMA 2000 1xEV-DV," IEEE Communications Magazine, Apr. 1, 2005.
Chung J. et al., "Packet synchronization and identification for incremental redundancy transmission in FH-CDMA systems" Third IEEE International Symposium on Personal, Indoor and Mobile Radio Communications, Oct. 21, 1992.
3rd Generation Partnership Project (3GPP), "LTE: Evolved Universal Terrestrial Radio Access (E-UTRA) Medium Access Control (MAC) Protocol Specification (Release 8)," 3GPP TS 36.321 v8.4.0, Jan. 2009.
European Patent Office Application Serial No. 07700845.6, Office Action dated May 22, 2013, 6 pages.
3rd Generation Partnership Project (3GPP), "Technical Specification Group Radio Access Network; Physical channels and mapping of transport channels onto physical channels (FDD) (Release 5)," 3GPP TS 25.211 V5.8.0, Dec. 2005, 39 pages.
The State Intellectual Property Office of the People's Republic of China Application Serial No. 201210049981.X, Office Action dated Nov. 4, 2014, 5 pages.
U.S. Appl. No. 12/159,849, Final Office Action dated Jan. 13, 2015, 11 pages.
U.S. Appl. No. 12/159,849, Final Office Action dated Jul. 24, 2015, 10 pages.
U.S. Appl. No. 13/874,199, Office Action dated Oct. 26, 2015, 12 pages.
U.S. Appl. No. 14/109,801, Notice of Allowance dated Sep. 24, 2015, 8 pages.
U.S. Appl. No. 12/159,849, Office Action dated Nov. 23, 2015, 10 pages.
United States Patent and Trademark Office U.S. Appl. No. 12/159,849, Notice of Allowance dated Mar. 21, 2016, 8 pages.

\* cited by examiner

TRANSMITTING DATA IN A MOBILE COMMUNICATION SYSTEM

CROSS-REFERENCE TO RELATED APPLICATIONS

This application is a continuation of U.S. patent application Ser. No. 14/483,940, filed on Sep. 11, 2014, now U.S. Pat. No. 9,036,596, which is a continuation of U.S. patent application Ser. No. 13/677,232, filed on Nov. 14, 2012, now U.S. Pat. No. 8,867,449, which is a continuation of U.S. patent application Ser. No. 12/797,576, filed on Jun. 9, 2010, now U.S. Pat. No. 8,340,026, which is a continuation of U.S. patent application Ser. No. 12/159,982, filed on Dec. 3, 2008, now U.S. Pat. No. 8,428,086, which is the National Stage filing under 35 U.S.C. 371 of International Application No. PCT/KR2007/000053, filed on Jan. 4, 2007, which claims the benefit of earlier filing date and right of priority to Korean Application No. 10-2006-0107103, filed on Nov. 1, 2006, and also claims the benefit of U.S. Provisional Application Nos. 60/757,063, filed on Jan. 5, 2006, 60/771,305, filed on Feb. 7, 2006, 60/784,976, filed on Mar. 22, 2006, and 60/815,722, filed on Jun. 21, 2006, the contents of which are all hereby incorporated by reference herein in their entirety.

TECHNICAL FIELD

The present invention relates to a mobile communication system, and more particularly, to transmitting data in the mobile communication system.

BACKGROUND ART

FIG. 1 is a structural diagram illustrating a Long Term Evolution (LTE) mobile communication system. The LTE system is an evolved version of a conventional Universal Mobile Telecommunications System (UMTS), and is being standardized under the 3rd Generation Partnership Project (3GPP) collaboration agreement.

An LTE network may be generally classified into an Evolved UMTS Terrestrial Radio Access Network (E-UTRAN) and a Core Network (CN). The E-UTRAN includes at least one eNode-B serving as a base station. The E-UTRAN also includes an Access Gateway (AG) located at the end of the network so that it is connected to an external network.

The AG may be classified into a user-traffic processing unit and a control-traffic processing unit. In this case, a first AG for processing new user traffic data may communicate with a second AG for processing control traffic data via a new interface. A single eNode-B may include at least one cell. A first interface for transmitting user traffic data or a second interface for transmitting control traffic data may be located between several eNode-Bs. The CN includes the AG and a plurality of nodes for registering users of User Equipments (UEs). If required, another interface for discriminating between the E-UTRAN and the CN may also be used in the LTE network.

Two important elements of the LTE network are an eNode-B and a UE. Radio resources of a single cell include uplink radio resources and downlink radio resources. The eNode-B allocates and controls the uplink and downlink radio resources. In more detail, the eNode-B determines which one of a plurality of UEs will use specific radio resources at a specific time. After performing determination, the eNode-B informs the specific UE of its decision, such that the eNode-B controls the UE to receive the downlink data. For example, the eNode-B may allocate radio resources ranging from 100 MHz to 101 MHz to a specific UE (e.g., No. 1 UE) after the lapse of a predetermined time of 3.2 seconds. Accordingly, the eNode-B may transmit downlink data to the No. 1 UB during a specific time of 0.2 seconds after the lapse of the predetermined time of 3.2 seconds.

In this way, the eNode-B determines which one of the plurality of UEs will perform uplink data transmission and the amount of radio resources the UE can use at a specific time. Moreover, the eNode-B determines a duration of time the UE has to transmit the uplink data.

Compared with a conventional art Node-B or base station, the above-mentioned eNode-B can effectively and dynamically manage radio resources. In the conventional art, a single UE is controlled to continuously use a single radio resource during a call connection time. However, considering the existence of a variety of recent services based on Internet Protocol (IP) packets, the conventional art is ineffective. For example, most packet services have several intervals, wherein no data is transmitted and no packets are generated during the call connection time. Thus, if radio resources are continuously allocated to only one UE, as in the conventional art, the allocation scheme is deemed ineffective. In order to solve this and other problems, the E-UTRAN system has been designed to allocate radio resources to a UE only when there is a need to use the UE, such as when service data is to be transmitted to the UE.

Uplink and downlink channels for transmitting data between the network and the UE will hereinafter be described in detail. There exist downlink channels for transmitting data from the network to the UE, such as a Broadcast Channel (BCH) for transmitting system information, and a downlink Shared Channel (SCH) and downlink Shared Control Channel (SCCH) for transmitting user traffic data or control messages. The traffic data or control messages of a downlink multicast service or broadcast service may be transmitted over the downlink shared channel (SCH), or additionally over a Multicast Channel (MCH). Furthermore, there also exist uplink channels for transmitting data from the UE to the network, such as a Random Access Channel (RACH), and an uplink shared channel (SCH) and uplink shared control channel (SCCH) for transmitting user traffic data or control messages.

FIG. 2 and FIG. 3 are conceptual diagrams illustrating a radio interface protocol structure between the UE and the UMTS Terrestrial Radio Access Network (UTRAN) based on a 3GPP radio access network standard.

The radio interface protocol horizontally includes a physical layer, a data link layer and a network layer. The radio interface protocol vertically includes a User Plane for transmitting data or information and a Control Plane for transmitting a control signal (also called "signaling data"). The protocol layers shown may be classified into a first layer (L1), a second layer (L2) and a third layer (L3) based on three lower layers of a well-known interconnection scheme, such as an Open System Interconnection (OSI) reference model.

The physical layer acting as the first layer (L1) provides an Information Transfer Service over a physical channel. A radio resource control (RRC) layer located at the third layer (L3) controls radio resources between the UE and the network. For this purpose, the RRC layer exchanges RRC messages between the UE and the network. The RRC layer may be distributed to a plurality of network nodes (i.e., eNode-B and AG, etc.), and may also be located at the eNode-B or the AG.

A radio protocol control plane will hereinafter be described with reference to FIG. 2. The radio protocol control plane includes a physical layer, a Medium Access Control (MAC) layer, a Radio Link Control (RLC) layer, and a Radio Resource Control (RRC) layer.

The physical layer acting as the first layer (L1) transmits an Information Transfer Service to an upper layer over a physical channel. The physical layer is connected to the Medium Access Control (MAC) layer (L2 layer) via a transport channel. The MAC layer communicates with the physical layer such that data is communicated between the MAC layer and the physical layer over the transport channel. Data may be communicated among different physical layers. Specifically, data is communicated between a first physical layer of a transmission end and a second physical layer of a reception end.

The MAC layer of the second layer (L2) transmits a variety of services to the RLC (Radio Link Control) layer (L2 layer) over a logical channel. The RLC layer of the second layer (L2) supports transmission of reliable data. A variety of functions of the RLC layer may also be implemented with a function block of the MAC layer. In this case, no RLC layer is necessary.

The RRC (Radio Resource Control) layer located at the uppermost part of the third layer (L3) is defined by the control plane only. The RRC layer controls logical channels, transport channels, and physical channels in relation to configuration, reconfiguration, and release operations of Radio Bearers (RBs). Here, an RB is indicative of a service received from the second layer (L2) to implement data communication between the UE and the E-UTRAN.

A radio protocol user plane will hereinafter be described with reference to FIG. 3. The radio protocol user plane includes the physical layer, the MAC layer, the RLC layer, and a Packet Data Convergence Protocol (PDCP) layer.

The physical layer of the first layer (L1) and the MAC and RLC layers of the second layer (L2) are equal to those of FIG. 2. In order to effectively transmit IP packets (e.g., IPv4 or IPv6) within a radio communication period having a narrow bandwidth, a PDCP layer of the second layer (L2) performs header compression to reduce the size of a relatively large IP packet header containing unnecessary control information.

A detailed description of the RLC layer will hereinafter be described in detail. The principal functions of the RLC layer are for guaranteeing a Quality of Service (QoS) of each RB and transmitting data associated with the QoS. The RB service is indicative of a specific service provided to an upper layer by the second layer of the radio protocol, such that all parts of the second layer affect the QoS. Specifically, it should be noted that the second layer is greatly affected by the RLC layer. The RLC layer assigns an independent RLC entity to each RB to guarantee a unique QoS of the RB. In this case, the RLC entity configures an RLC protocol data unit (PDU) according to the size of radio resources determined by a lower layer (i.e., the MAC layer).

Therefore, when transmitting the RLC PDU to the MAC layer, the RLC entity located at the eNode-B configures data having a predetermined size determined by the MAC entity, and transmits the RLC PDU to the MAC entity. The RLC entity located at the UE also configures the RLC PDU according to the size of radio resources determined by the lower layer (i.e., the MAC layer). Therefore, when transmitting the RLC PDU to the MAC layer, the RLC entity located at the UE configures data having a predetermined size determined by the MAC entity, and transmits the RLC PDU to the MAC entity.

DISCLOSURE OF INVENTION

The present invention is directed to transmitting data in a mobile communication system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for transmitting data in a mobile communication system, the method comprising transmitting first data to a receiving side, receiving acknowledgment information for indicating whether the first data was successfully transmitted to the receiving side, if the first data was not successfully transmitted to the receiving side, determining whether an amount of available radio resources is sufficient for retransmitting the first data to the receiving side, retransmitting the first data to the receiving side if the amount of available radio resources is sufficient to retransmit the first data, reconfiguring the first data into at least one second data if the amount of available radio resources is insufficient to retransmit the first data, wherein the at least one second data can be transmitted to the receiving side using the amount of available radio resources, and transmitting the at least one second data to the receiving side.

Preferably, the acknowledgment information is received from the receiving side. Preferably, the acknowledgment information is received from a lower layer of a transmitting side.

In one aspect of the invention, the first data is a radio link control layer protocol data unit (RLC PDU) comprising at least one of a sequence number (SN) field, a control/data/subframe (C/D/S) field, a complete/partial (C/P) field, a following (F) field, and a length indicator (LI) field. Preferably, the control/data/subframe (C/D/S) field indicates whether the RLC PDU is the first data or second data. Preferably, the C/P field indicates how the RLC PDU is aligned to an upper layer service data unit (SDU).

In another aspect of the invention, the second data is a radio link control layer sub protocol data unit (RLC subPDU) comprising at least one of a sequence number (SN) field, a control/data/subframe (C/D/S) field, a subframe sequence number (sSN) field, a remaining (RM) field, a complete/partial (C/P) field, a following (F) field, and a length indicator (LI) field. Preferably, the sSN field indicates a sequential order of one of the at least one second data within a plurality of transmitted second data related to the first data. Preferably, the RM field indicates whether a subsequent second data exists after one of the at least one second data.

In a further aspect of the invention, the amount of available radio resources comprises a maximum amount of data scheduled to be transmitted to the receiving side.

In yet another aspect of the invention, a maximum amount of available radio resources is indicated by scheduling information received from a network. Preferably, the scheduling information indicates timing and frequency of the available radio resources.

In accordance with another embodiment of the present invention, an apparatus for transmitting data in a mobile communication system comprises means for transmitting first data to a receiving side, means for receiving acknowledgment information for indicating whether the first data was successfully transmitted to the receiving side, if the first data was not successfully transmitted to the receiving side, means for determining whether an amount of available radio resources is sufficient for retransmitting the first data to the receiving side, means for retransmitting the first data to the receiving side if the amount of available radio resources is sufficient to retransmit the first data, means for reconfiguring the first data into at least one second data if the amount of available radio resources is insufficient to retransmit the first data, wherein the at least one second data can be transmitted to the receiving side using the amount of available radio resources, and means for transmitting the at least one second data to the receiving side.

Preferably, the acknowledgment information is received from the receiving side. Preferably, the acknowledgment information is received from a lower layer of a transmitting side.

In one aspect of the invention, the first data is a radio link control layer protocol data unit (RLC PDU) comprising at least one of a sequence number (SN) field, a control/data/subframe (C/D/S) field, a complete/partial (C/P) field, a following (F) field, and a length indicator (LI) field.

In another aspect of the invention, the second data is a radio link control layer sub protocol data unit (RLC subPDU) comprising at least one of a sequence number (SN) field, a control/data/subframe (C/D/S) field, a subframe sequence number (sSN) field, a remaining (RM) field, a complete/partial (C/P) field, a following (F) field, and a length indicator (LI) field.

In a further aspect of the invention, the amount of available radio resources comprises a maximum amount of data scheduled to be transmitted to the receiving side.

In yet another aspect of the invention, a maximum amount of available radio resources is indicated by scheduling information received from a network. Preferably, the scheduling information indicates timing and frequency of the available radio resources.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

BEST MODE FOR CARRYING OUT THE INVENTION

Figure 1:
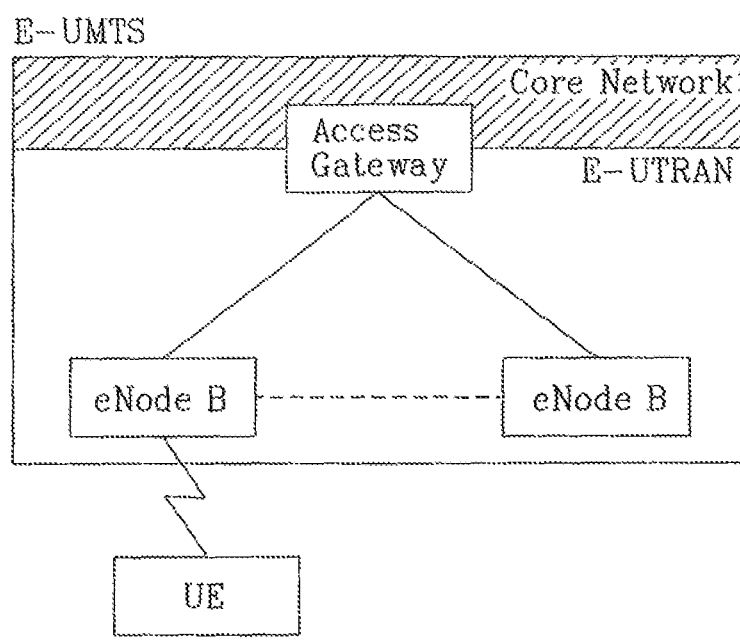
FIG. 1 is a structural diagram illustrating a Long Term Evolution (LTE) mobile communication system.
Figure 2:
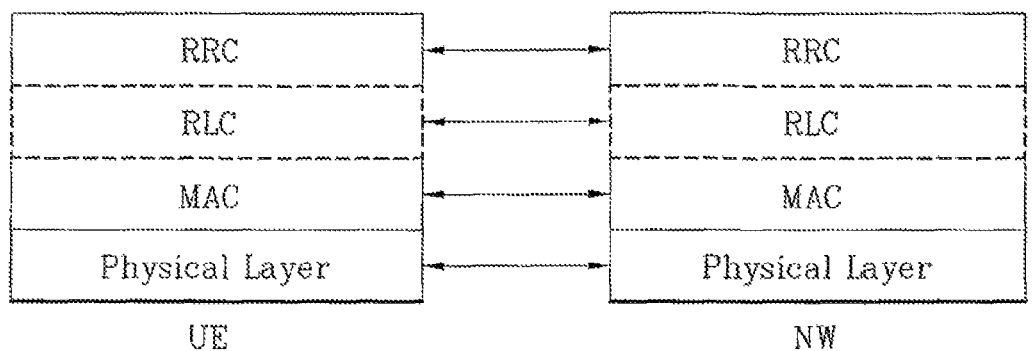
FIG. 2 is a diagram illustrating a control plane of a radio interface protocol structure between a UE and a UMTS Terrestrial Radio Access Network (UTRAN) based on a 3GPP radio access network standard.
Figure 3:
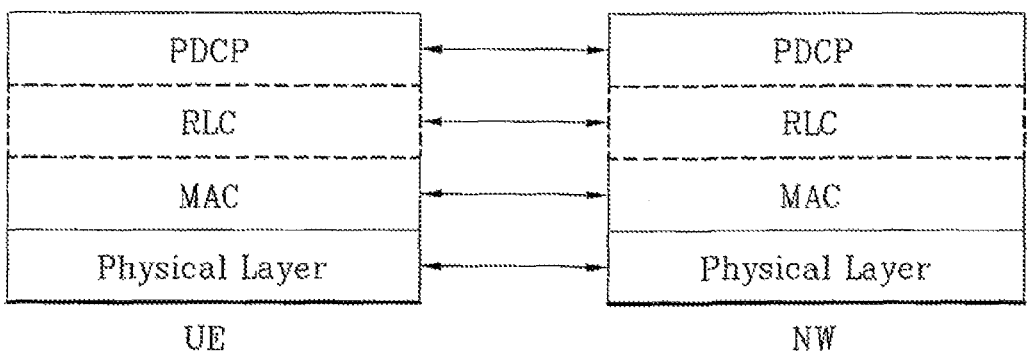
FIG. 3 is a diagram illustrating a user plane of a radio interface protocol structure between the UE and the UMTS Terrestrial Radio Access Network (UTRAN) based on a 3GPP radio access network standard.

The present invention relates to transmitting data in a mobile communication system.

Reference will now be made in detail to the preferred embodiments of the present invention, examples of which are illustrated in the accompanying drawings. Wherever possible, the same reference numbers will be used throughout the drawings to refer to the same or like parts. A method for transmitting data of a mobile communication system according to the present invention will hereinafter be described.

Prior to describing the present invention, it should be noted that the following preferred embodiments of the present invention allow an RLC layer to reconfigure information received from an upper layer in the above-mentioned hierarchical structure shown in the conventional art, and transmit the reconfigured information to the MAC layer. However, it is obvious to those skilled in the art that the scope of the present invention is not limited to only the above-mentioned RLC layer's transmission case, and can also be applied to other examples. First information, transmitted from an upper layer and received by the RLC layer is referred to as an RLC service data unit (SDU). Second information, which comprises the RLC SDU reconfigured by the RLC layer and transmitted to the MAC layer, is referred to as an RLC PDU. Third information, which comprises the RLC PDU reconfigured by the MAC layer, is referred to as a MAC PDU.

The RLC layer provides two RLC modes, i.e., an Unacknowledged Mode (UM or UM mode) and an Acknowledged Mode (AM or AM mode). The UM and AM modes support different QoSs, such that a difference in operation methods exists between them. Detailed functions of the UM and AM modes are also different from each other. Accordingly, the function of the RLC layer according to its operation modes will be described.

As a matter of convenience and better understanding of the present invention, the RLC in the UM mode is referred to as a UM RLC while the RLC in the AM mode is referred to as an AM RLC. The UM RLC attaches a PDU header including a sequence number (SN) to each PDU generated, and transmits the resultant PDU equipped with the PDU header, such that a reception end can recognize which one of a plurality of PDUs is lost during transmission. Accordingly, the UM RLC preferably performs transmission of broadcast/multicast data or transmission of real-time packet data (e.g., voice over Internet protocol (VoIP) or streaming) of a Packet Service (PS) domain in a user plane. In a control plane, the UM RLC preferably performs transmission of a UM RRC message from among a plurality of RRC messages transmitted to a specific UE or specific UE group contained in a cell.

The AM RLC attaches the PDU header including the SN to each PDU generated in the same manner as the UM RLC; however, in contrast to the UM RLC, the AM RLC commands a reception end to acknowledge the PDU transmitted from a transmission end. Accordingly, when performing the PDU acknowledgment, the reception end may request retransmission of any PDU not received from the transmission end.

By utilizing the retransmission function, the AM RLC can guarantee transmission of error-free data. Accordingly, the AM RLC performs transmission of non-real-time packet data such as a Transmission Control Protocol/Internet Protocol (TCP/IP) of the PS domain in the user plane. In the control plane, the AM RLC performs transmission of an RRC message requiring an acknowledgement response (AM RRC message) from among a plurality of RRC messages transmitted to a specific UE contained in a cell.

Directionally, the AM RLC is used for bi-directional communication because a feedback signal is received from the reception end, whereas the UM RLC is used for uni-directional communication. Preferably, the bi-directional communication is used for a point-to-point (PTP) communication, such that the AM RLC employs a dedicated logical channel.

Structurally, the UM RLC includes a single RLC entity comprising a single transmission structure or a single reception structure. In contrast, the AM RLC includes a single RLC entity comprising the transmission structure and the reception structure. The AM RLC structure is more complex because of the retransmission function. In order to manage the retransmission function, the AM RLC includes a transmission/reception buffer as well as a retransmission buffer, and performs a variety of functions. The AM RLC functions comprise a usage function of a transmission/reception window for flow control, a polling function for requesting status information from the reception end of a peer-RLC entity by the transmission end, a status report function for allowing the reception end to report its buffer state to the transmission end of the peer-RLC entity, a status PDU function for carrying status information, and a piggyback function for inserting a status PDU in a data PDU to increase efficiency of data transmission, for example.

Additionally, if the AM RLC detects important errors during its operation, the AM RLC may perform additional functions, such as a reset PDU function for requesting reconfiguration of all operations and parameters from a counterpart AM RLC entity and a reset ACK PDU function for replying to the reset PDU, for example.

In order to support the above-mentioned functions, the AM RLC requires a variety of protocol parameters, status variables, and a timer. A variety of PDUs used for the above-mentioned functions, such as the status report function, the status PDU function and the reset PDU function, as well as PDUs for controlling AM RLC data transmission are referred to as control PDUs. Other PDUs for transmitting user data are referred to as data PDUs.

Preferably, the AM mode uses Automatic Repeat Request (ARQ) information and the UM mode does not. Here, the ARQ information is indicative of transmission/reception acknowledgement (ACK) information. Preferably, the transmission/reception ACK information indicates information related to a data block normally transmitted from the transmission end to the reception end, or other information related to an erroneous data block abnormally transmitted from the transmission end to the reception end.

A representative example of an RLC PDU format for use in the UM mode is shown in Table 1.

TABLE 1

| SN | C/P | F | LI | F | LI | ... | F | RLC SDU 1 | RLC SDU 2 | ... | RLC SDU N |
|----|-----|---|----|----|----|-----|----|-----------|-----------|-----|-----------|

With reference to Table 1, a Sequence Number (SN) field indicates a data flow of a corresponding RLC PDU, or indicates location information on a logical channel. A complete/partial (C/P) field indicates whether a first data part of the RLC PDU is equal to a first part of an associated SDU. The C/P field also indicates whether a last data part of the RLC PDU is equal to and end part of any associated SDUs.

For example, if the value of the C/P field is "00", the beginning part of the PDU is equal to the beginning part of the SDU, and the end of the PDU is equal to the end of the SDU. If the value of the C/P field is "01", the beginning part of the PDU is equal to the beginning part of the SDU, and the end of the PDU is not equal to the end of the SDU. If the value of the C/P field is "10", the beginning part of the PDU is not equal to the beginning part of the SDU, and the end of the PDU is equal the end of the SDU. If the value of the C/P field is "11", the beginning part of the PDU is not equal to the beginning part of the SDU, and the end of the PDU is not equal to the end of the SDU.

A length indicator (LI) field indicates a boundary of an RLC SDU. Thus, if a single RLC PDU includes two RLC SDUs, the reception end can separate between the RLC SDUs using the boundary information of the RLC SDU. A following (F) field indicates whether a next field is the LI field or data.

Compared with the AM mode, the RLC PDU format of the UM mode need not transmit/receive the transmission/reception acknowledgment information. Accordingly, the RLC PDU of the UM mode is simpler than the AM mode and can have one header format. Moreover, if a transmission time point of a corresponding RLC PDU can be distinguished by a lower end according to retransmission information (i.e., redundancy-version information), then the SN field may be deleted.

A representative example of an ARQ RLC PDU format for transmission of general data in the AM mode is shown in Table 2.

TABLE 2

| SN | C/D/S | C/P | F | LI | F | LI | ... | F | RLC SDU 1 | RLC SDU 2 | ... | RLC SDU N | Control PDU(opt) |
|----|-------|-----|---|----|---|----|----|----|-----------|-----------|-----|-----------|------------------|

A representative example of an ARQ RLC PDU format for transmission of control information (e.g., transmission/reception acknowledgment information) in the AM mode is shown in Table 3.

TABLE 3

| SN | C/D/S | Control PDU |
|----|-------|-------------|

Preferably, if the ARQ RLC PDU format of Table 2 cannot be transmitted to a destination without any change under the AM mode, an ARQ RLC subPDU is configured. Accordingly, a representative example of the ARQ RLC subPDU is shown in Table 4.

TABLE 4

| SN | C/D/S | sSN | RM | C/P | F | LI | F | LI | ... | F | RLC SDU 1 | RLC SDU 2 | ... | RLC SDU N | Control PDU(opt) |
|---|---|---|---|---|---|---|---|---|---|---|---|---|---|---|---|

With reference to Tables 2, 3, and 4, the SN field, the C/P field, the LI field and the F field are equal to those of Table 1. Therefore, their detailed description will herein be omitted for convenience.

A Control/Data/Subframe (C/D/S) field indicates whether a corresponding RLC PDU is the ARQ RLC PDU, the ARQ RLC control PDU, or the ARQ RLC subPDU. A subframe Sequence Number (sSN) field indicates location information of a corresponding subPDU from among a plurality of associated subPDUs. A remaining (RM) field indicates the presence or absence of associated subPDUs after the corresponding subPDU. In view of this, the ARQ RLC subPDU shown in Table 4 will be described in detail with reference to the following preferred embodiments of the present invention.

Figure 4:
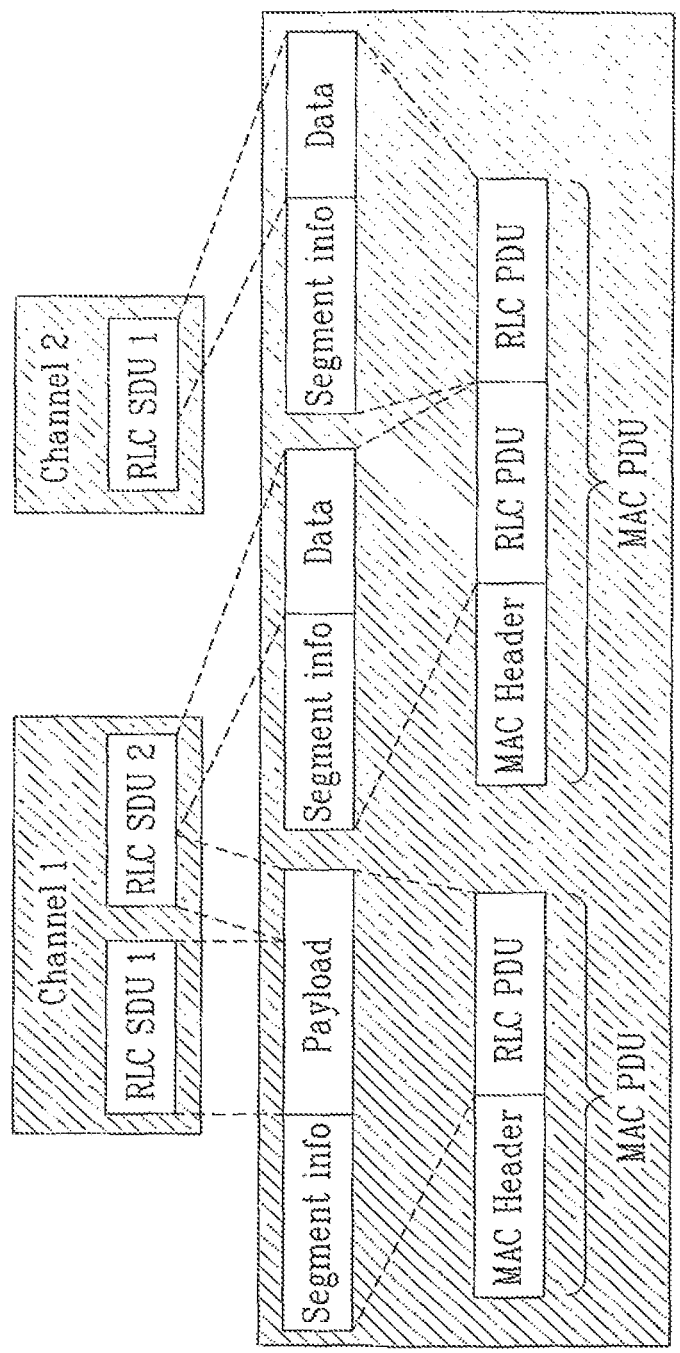
FIG. 4 is a diagram illustrating a method for constructing a MAC PDU in an RLC SDU in accordance with one embodiment of the present invention.

FIG. 4 is a diagram illustrating a method for constructing a MAC PDU in an RLC SDU in accordance with one embodiment of the present invention. Preferably, the present invention is a method for constructing a data unit in the RLC or MAC layer.

Referring to FIG. 4, the MAC layer of the UE receives information indicating an amount of available radio resources from an eNode-B. Preferably, the MAC layer receives specific information indicating an amount of radio resources that can be used during a next transmission time from the eNode-B.

From the perspective of the eNode-B, the MAC layer of the eNode-B determines whether downlink or uplink radio resources will be used. The MAC layer of the eNode-B also determines the amount of radio resources that will be allocated to individual UEs during a next transmission period and informs the MAC layer of each UE of the determination. By considering a plurality of data units stored in the UEs' buffers and a priority of the data units, each of the UEs determine the amount of data that will be transmitted through each logical channel or from each RLC entity. In other words, each RLC entity determines the size of the RLC PDU to be transmitted to the MAC layer.

Accordingly, by considering an amount of downlink data of the UEs and priority of each data, the MAC layer located at the eNode-B determines the amount of data that will be allocated to individual RLC entities, and informs each RLC of the determination. Each RLC then configures the RLC PDU according to the determination, and transmits the RLC PDU to the MAC layer.

Preferably, the MAC entity is connected to several RLC entities. Each RLC entity receives an RLC SDU from an upper layer, generates an RLC PDU by applying a command of the MAC layer to the received RLC SDU, and transmits the generated RLC PDU to the MAC entity. The MAC entity combines RLC PDUs received from individual RLC entities, configures the combined RLC PDUs in the form of a single MAC PDU, and transmits the single MAC PDU to a physical layer.

In order to improve communication efficiency under the aforementioned situation, it is preferable that the number of padding bits contained in the MAC PDU or the RLC PDU be reduced. Preferably, a predetermined number of bits used for adjusting the size are reduced. For this operation, the MAC entity receives data from several logical channels (i.e., several RLC entities) and configures the MAC PDU using the received data.

However, in order to command the reception end to normally recover the RLC PDUs from the MAC PDU, specific information for indicating the amount of data contained in each logical channel is needed. Therefore, it is preferable to include information indicating an amount of data corresponding to individual logical channels or other information indicating identifiers (IDs) of the logical channels.

Preferably, the reception end extracts information of the RLC PDU using a logical channel ID contained in the MAC PDU header and data-block size information of each logical channel. The reception end then transmits the extracted information to the corresponding RLC entities.

Operations of the MAC and RLC layers according to the present invention will hereinafter be described with further reference to FIG. 4. The MAC PDU includes a MAC header and an RLC PDU. The RLC PDU includes data of the RLC SDU and segment information associated with the RLC SDU received from the upper layer. The segment information performs a function similar to the RLC header. Preferably, the segment information includes boundary information of the RLC SDU in a single RLC PDU, for example. The MAC header indicates the size of each RLC PDU contained in the MAC PDU and which one of a plurality of RLC entities or logic channels corresponds to each RLC PDU.

If control information (e.g., status report information) for indicating a reception status is contained in the MAC PDU, the control information is contained in a single RLC PDU. Accordingly, the MAC header may indicate the presence of the control information. In this case, the control information may be exemplarily implemented with a method for employing a logical channel ID having a special value.

Figure 5:
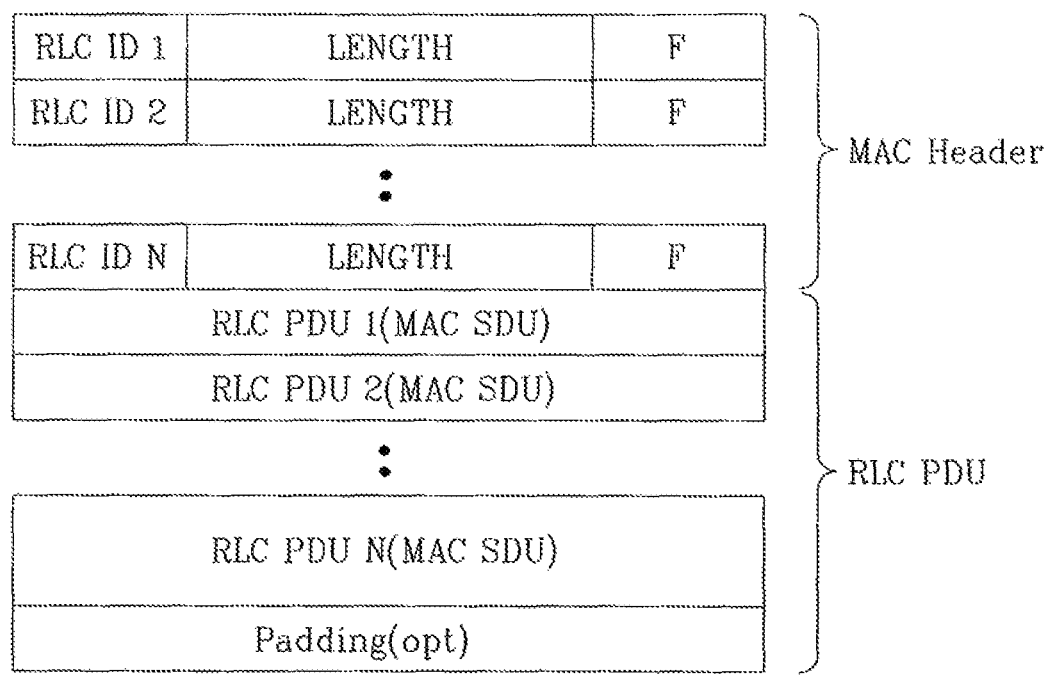
FIG. 5 is a structural diagram illustrating a MAC PDU format in accordance with one embodiment of the present invention.

FIG. 5 is a structural diagram illustrating a MAC PDU format in accordance with one embodiment of the present invention. Preferably, the MAC PDU is based on the RLC PDU received from an upper RLC entity.

Referring to FIG. 5, an RLC ID field indicates that a corresponding RLC PDU has been received over a specific logical channel or from a specific RLC entity A Length field indicates the size of each RLC PDU. The F field indicates whether following values are acquired by a combination of the RLC ID field, the Length field and the F field or whether the following values are real RLC PDUs.

Notably, data may be unexpectedly lost over physical channels of communication systems. Compared to the conventional system, the physical layer of a UTRAN system can more correctly transmit data from the transmission end to the reception end. However, the probability of data transmission error is not completely removed from the UTRAN system. Specifically, the longer the distance from the UE to the eNode-B, the higher the data loss rate of the UB.

Therefore, the communication system of the present invention requires a special management method such as when TCP data requires error-free transmission or signaling data. Accordingly, the communication system may use the AM mode. With regard to a TCP packet, the size of the TCP packet can be extended to 1500 bytes. Therefore, if the TCP packet configured in the form of the RLC SDU is transmitted to the RLC, the RLC entity can recombine the TCP packet within a specific size allowed by a lower layer (i.e., MAC layer) and transmit the recombined TCP packet to a destination.

Several RLC PDUs generated by the above-mentioned recombination are transmitted to the reception end via the physical layer. However, if at least one RLC PDU corresponding to a single RLC SDU is not received in the reception end, the reception end informs the transmission end of RLC PDU non-reception. In this case, if the transmission end retransmits an entire RLC SDU associated with the lost RLC PDU, a large amount of radio resources may be wasted.

For example, the RLC SDU of 1500 bytes is divided into ten RLC PDUs, each of which has 150 bytes. If a single RLC PDU from among the 10 RLC PDUs is not correctly received in the reception end, the entire RLC SDU is retransmitted according to the above-mentioned situation. Accordingly, a data amount of 1400 bytes is unnecessarily wasted. In this case, there is a need to perform the retransmission at the RLC PDU level.

Wireless environments provided when the RLC PDU is to be retransmitted may be different from those during initial transmission of the RLC PDU. For example, if the RLC PDU is initially transmitted, a corresponding RLC entity can transmit data of 200 bytes during a unit time. However, when the RLD PDU is retransmitted, a corresponding RLC entity may unexpectedly transmit data of only 50 bytes during the unit time. In this case, the RLC PDU cannot be retransmitted without change. Specifically, the RLC PDU having an original format cannot be retransmitted to a desired destination. In order to solve this problem, one embodiment of the present invention divides the original RLC PDU into several RLC subPDUs. Preferably, the present invention allows a transmission end to receive reception status information from the reception end after the transmission end transmits the RLC PDU. Thereafter, the transmission end performs retransmission according to the radio resources presently allocated to the transmission end.

Figure 6:
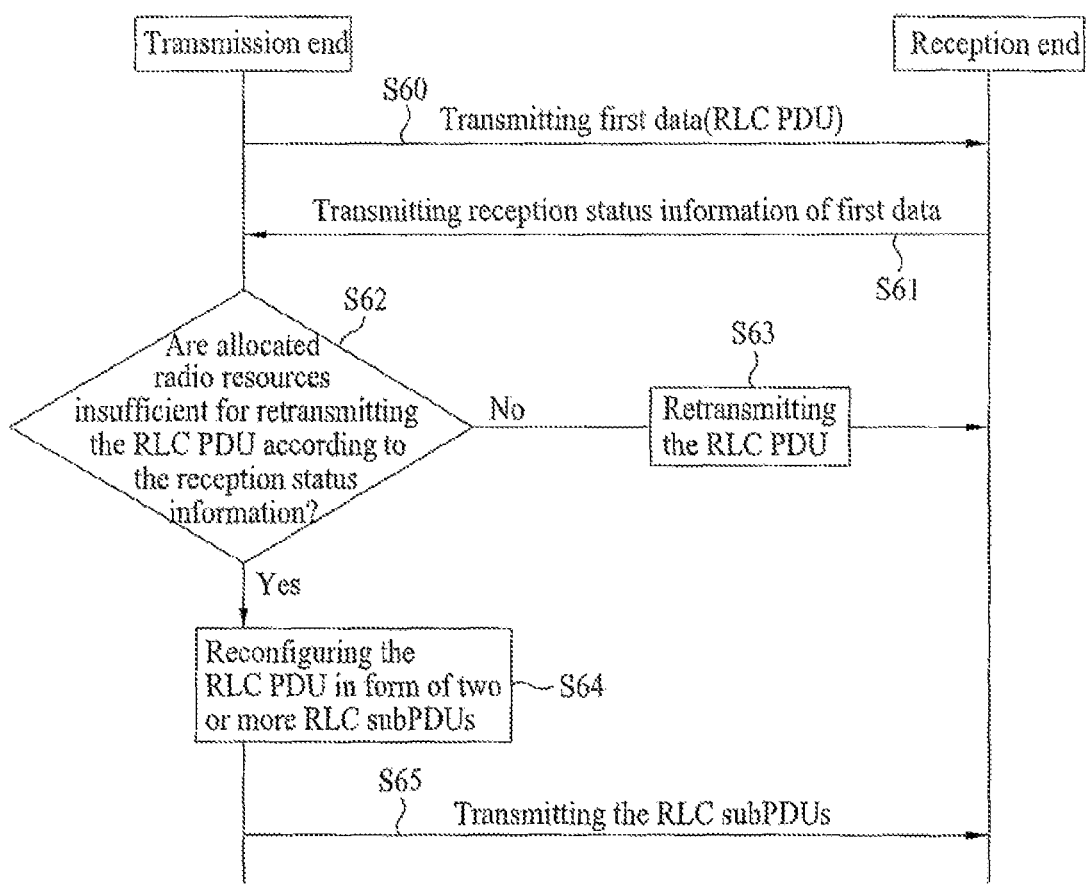
FIG. 6 is a flow chart illustrating a method for transmitting data of a mobile communication system in accordance with one embodiment of the present invention.

FIG. 6 is a flow chart illustrating a method for transmitting signals of a mobile communication system in accordance with one embodiment of the present invention. Referring to FIG. 6, the transmission end transmits first data of the RLC PDU to the reception end (S60). The reception end receives the first data and transmits the transmission/reception acknowledgment information (e.g., ACK/NACK signals) of the RLC PDU and reception status information for the received first data (S61).

If the first data is to be retransmitted, the transmission end determines which one of a plurality of RLC PDUs was not received by the reception end using the transmission/reception acknowledgment information received from the reception end. Thereafter, the transmission end recognizes an amount of radio resources available for the retransmission (S62).

If the RLC PDU can be retransmitted using the available amount of radio resources, the RLC PDU is retransmitted (S63). However, if the RLC PDU cannot be retransmitted using the available amount of radio resources, the RLC PDU is reconfigured in the form of two or more RLC subPDUs (864), such that the RLC subPDUs can be transmitted using the available amount of radio resources (S65).

In other words, if the RLC PDU data is required to be retransmitted, and an amount of radio resources allocated to the transmission end is less than the size of the initial RLC PDU, the transmission end reconfigures the RLC PDU in the form of two or more RLC subPDUs (S64), and transmits the RLC subPDUs to the reception end (S65). Preferably, each RLC entity configures a predetermined size of radio resources allocated by the lower layer.

The amount of radio resources is indicative of a maximum amount of data capable of being transmitted from the transmission end. The transmission end also includes a transmission-end RLC.

If there is a need to reconfigure the RLC PDU using scheduling information or other information loaded in the transmission/reception acknowledgment information, the RLC PDU is reconfigured in the form of two or more RLC subPDUs such that the RLC subPDUs can be transmitted to the reception end. The transmission end can also reconfigure the RLC PDU in the form of two or more RLC subPDUs on the condition that any one of the transmitted RLC PDUs does not arrive at the reception end.

In one aspect of the invention, the scheduling information or transmission/reception acknowledgment information received at the reception end from the transmission end indicates the size of the RLC subPDUs reconfigured by the transmission end. Preferably, the scheduling information is transmitted from the eNode-B to the UE for indicating which one of a plurality of UEs will use a predetermined size of radio resources during a predetermined time. Specifically, the scheduling information indicates size information of radio resources to be used by a determined UE, and time information to be used by the determined UE according to the radio resources having the size information.

Preferably, the transmission/reception acknowledgment information is transmitted from the reception end to the transmission end for indicating the correct reception of one of a plurality of PDUs or SDUs at the reception end. The transmission/reception acknowledgment information also indicates the non-reception of one of the plurality of PDUs or SDUs at the reception end. The reception end recognizes whether a received data block is the RLC PDU or the RLC subPDU. If the reception end can not recognizes, the reception end reassembles an RLC SDU by binding non-related data in a single bundle. Otherwise, the order of data units contained in the single RLC SDU may be changed from an original order.

In order to distinguish between the RLC PDU and the RLC subPDU, an additional field capable of discriminating between the RLC PDU and the RLC subPDU may be added to a header part of a data block communicated between the RLC and MAC. According to the value of the additional field, the RLC of the reception end can determine whether the data block received from the lower MAC layer is the RLC PDU or the RLC subPDU. In this way, when transmitting the data block to the lower MAC layer, the RLC entity of the transmission end determines whether its transmission data is the RLC PDU or the RLC subPDU, and can properly establish a PDU/subPDU discriminator for the header part of the data block.

Preferred embodiments of the RLC subPDUs will hereinafter be described with reference to the drawings. Notably, the following RLC subPDUs formats are not limited to the preferred embodiments of the present invention, and can also be applied to other examples as necessary.

Figure 7:
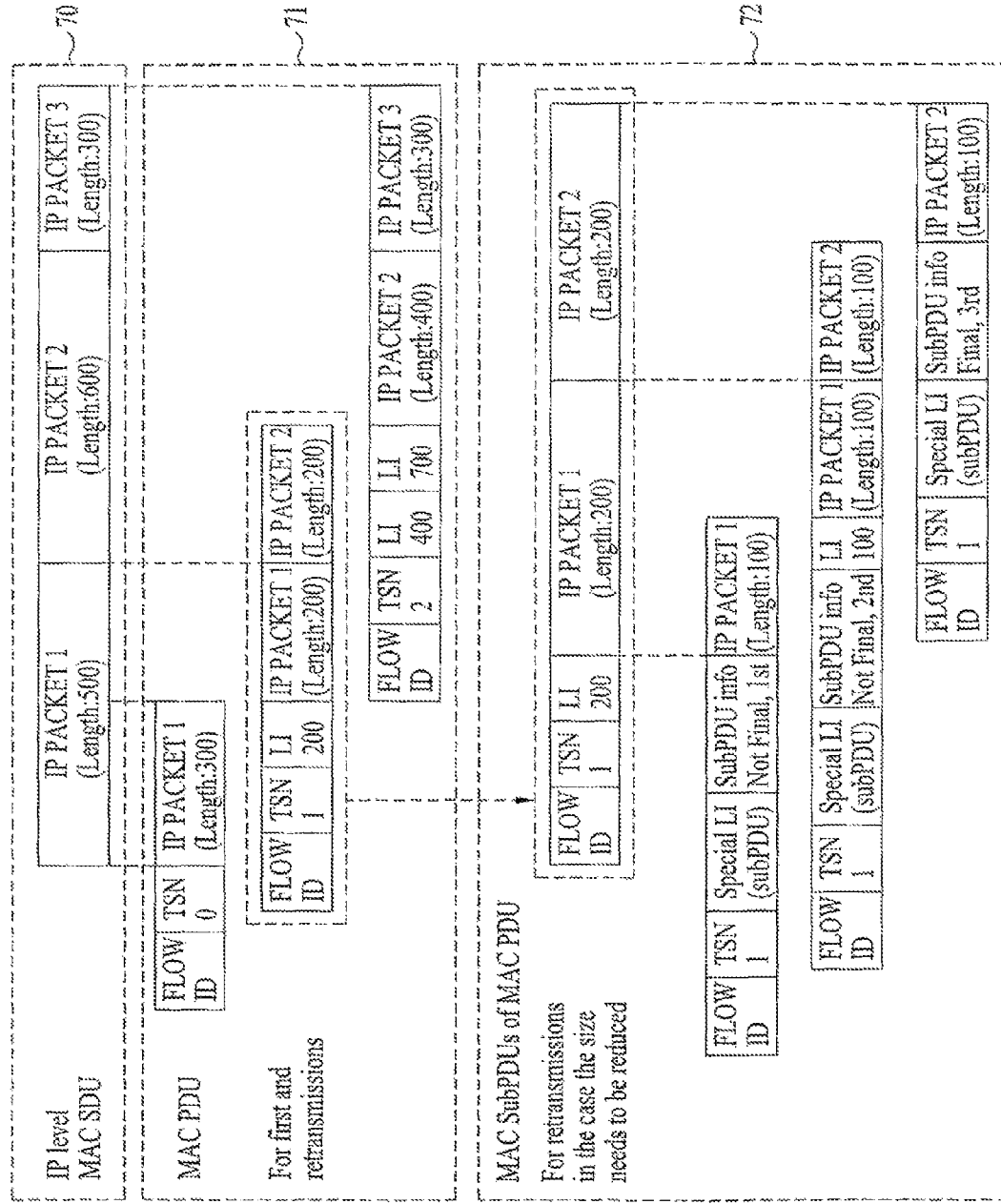
FIG. 7 is a diagram illustrating a method for transmitting data of a mobile communication system in accordance with one embodiment of the present invention.

FIG. 7 is a diagram illustrating a method for transmitting data of a mobile communication system in accordance with one embodiment of the present invention. Referring to FIG. 7, a first block 70 includes three IP packets. Preferably, the three IP packets are considered RLC SDUs from the viewpoint of the RLC entity. Preferably, sizes of individual IP packets for use in one embodiment of the present invention are 500 bits, 600 bits and 300 bits, respectively.

A second block 71 indicates how to configure the RLC PDUs using the three IP packets. Here, it is assumed that the allowed sizes of the RLC PDUs under wireless environments at initial transmission are 300 bits, 400 bits and 700 bits, respectively. Moreover, an RLC PDU includes several header fields.

A detailed description of individual header fields in accordance with the present invention is as follows. A Flow ID (Queue ID) field indicates which one of a plurality of RBs or which one of a plurality of RLC entities is associated with the RLC PDU. Indeed, a single UE includes several RBs having different QoSs and characteristics or several RLC entities having different QoSs and characteristics. Therefore, the Flow ID field discriminates an individual RB from other RBs.

A Transmission Sequence Number (TSN) field helps rearrange or manage retransmission of the received RLC PDUs. Preferably, the TSN value increases by a specific value "1" whenever a new RLC PDU is generated. Thus, the TSN indicates the order of individual RLC PDUs in a single RLC entity.

A Length Indicator (LI) field indicates a boundary of an RLC SDU. Thus, if a single RLC PDU includes two RLC SDU parts, a reception end can properly separate between the RLC SDUs using the boundary information of the RLC SDU.

A third block 72 indicates how to reconfigure the RLC PDU in the form of RLC subPDUs. When a reception end informs a transmission end of non-reception of a specific RLC PDU using an ARQ operation, the transmission end is required to retransmit the RLC PDU. However, at a specific time at which the retransmission is required, an amount of radio resources available for use by a lower layer of the transmission end may be insufficient for transmitting the RLC PDU. Accordingly, it is preferable to divide the RLC PDU into RLC subPDUs, or reconfigure the RLC PDU in the form of RLC subPDUs, such that the RLC subPDUs can be transmitted to the reception end using the available radio resources.

Referring to FIG. 7, a method for reconfiguring a second RLC PDU of the second block 71 in the form of a plurality of RLC subPDUs will hereinafter be described. Here, it is assumed that the amount of data capable of being transmitted during a unit time based on wireless environments when retransmitting from a lower end (or lower layer) is 100 bits, 200 bits and 100 bits, respectively. Therefore, the RLC PDU to be retransmitted is configured in the form of RLC subPDUs to which 100 bits, 200 bits and 100 bits are sequentially assigned.

Preferably, the transmission end informs the reception end of a transmission when transmitting the RLC PDU or RLC subPDUs. Thus, to distinguish the RLC subPDUs from the RLC PDU, the LI field having a specific value may be used. In FIG. 7, a special LI field is used during transmission of an RLC subPDU. Therefore, whenever the reception end receives the special LI field, the reception end determines that the received data block is an RLC subPDU, and performs operations accordingly.

Generally, the reception end uses the LI field to determine the boundary of an RLC SDU. However, if the reception end receives a RLC PDU with a LI field set to specific value, the reception end regards the received RLC PDU as RLC SubPDU. In that case, to identify the original RLC PDU associated with the received RLC subPDU, the TSN field of the RLC subPDUs is set to the same value as the TSN field of the original RLC PDU. Therefore, the reception end can recognize location information of the received RLC subPDUs, associated RLC PDUs or associated RLC SDUs.

Accordingly, if a single RLC PDU is divided into several RLC subPDUs, additional information is required in order for a reception end to determine the order of the received RLC subPDUs. Thus, a subPDU info field is preferably used for this purpose.

The subPDU info field indicates whether a specific RLC subPDU is located at an end part of its associated RLC PDU and relative location information of the specific RLC subPDU among associated RLC subPDUs. For example, referring to the third block 72 of FIG. 7, the subPDU info field of the third RLC subPDU indicates that the particular RLC subPDU is a final RLC subPDU associated with the RLC PDU, and that the particular RLC subPDU is the third RLC subPDU among RLC subPDUs associated with the RLC PDU.

Although the RLC subPDUs are retransmitted from the transmission end to the reception end as described above, the reception end may not correctly receive some parts of the RLC subPDUs. Accordingly, the RLC subPDUs may be further divided into lower data blocks. However, if the probability of losing all of the RLC PDU and associated RLC subPDUs is extremely low, it is preferable that a RLC subPDU is not further divided.

Figure 8:
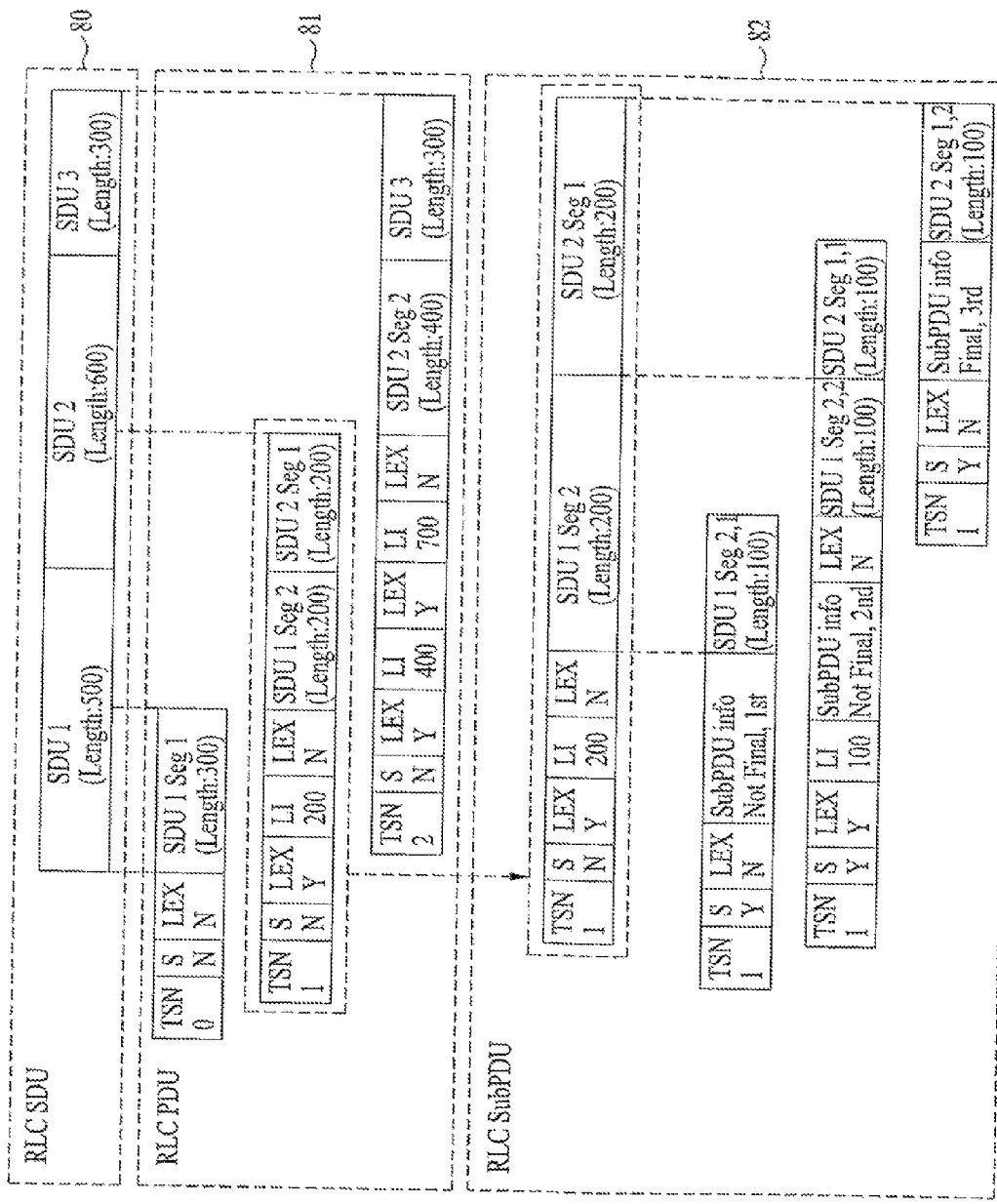
FIG. 8 is a diagram illustrating a method for transmitting signals of a mobile communication system in accordance with another embodiment of the present invention.

FIG. 8 is a diagram illustrating a method for transmitting data of a mobile communication system in accordance with one embodiment of the present invention. Referring to FIG. 8, a first block 80, a second block 81 and a third block 82 are structurally similar to the first, second and third block of FIG. 7. However, additional fields are depicted in FIG. 8.

A subframing indicator (S) field indicates that the received data block is RLC subPDU of an RLC PDU. Preferably, if the S field is set to "Y", then a corresponding data block is an RLC subPDU.

A length extension indicator (LEX) field indicates whether a next field is an LI field or an RLC SDU. If the LEX field is set to "Y", then the next field is the LI field. A subPDU info field is used when a reception end rearranges the RLC subPDUs.

Figure 9:
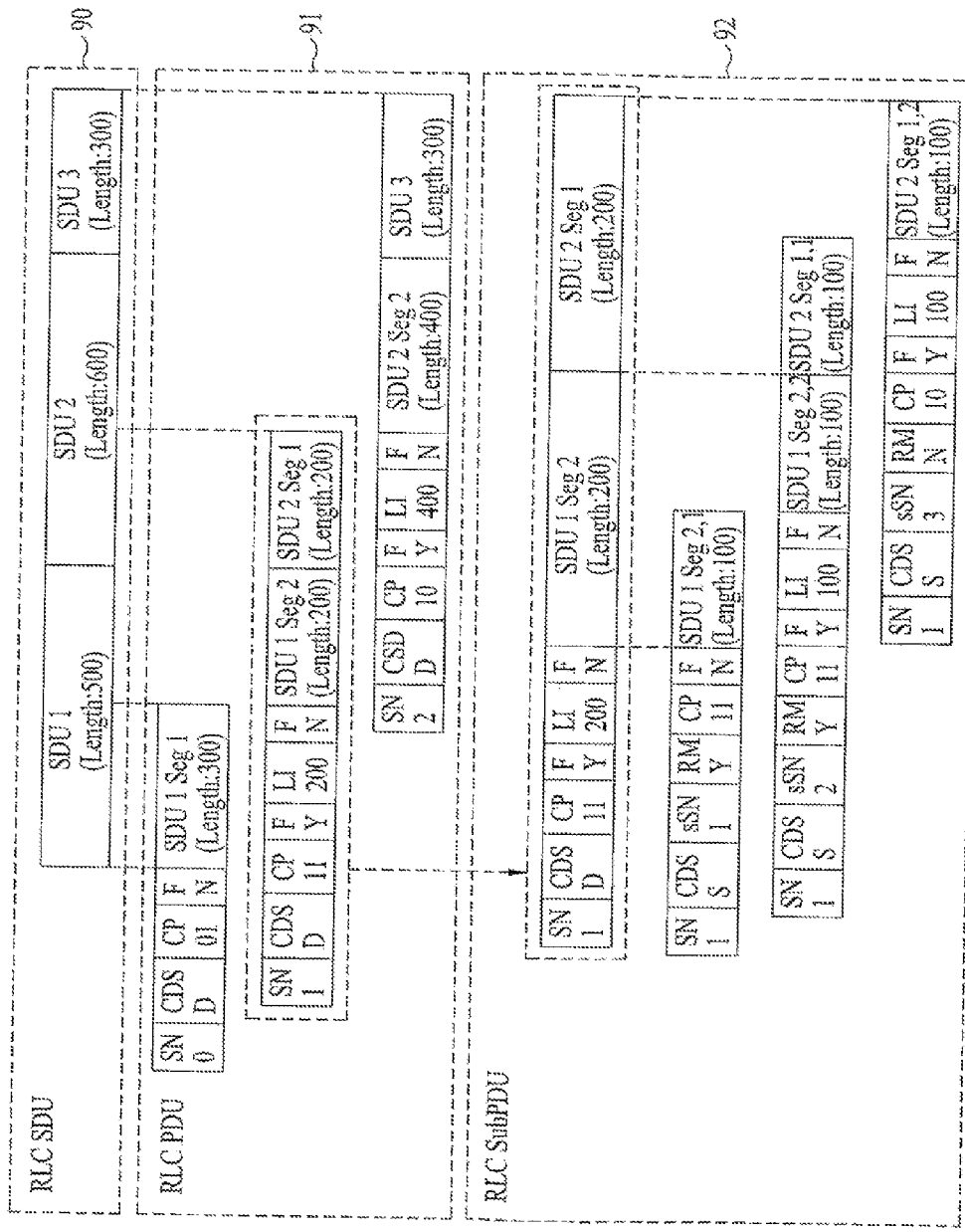
FIG. 9 is a diagram illustrating a method for transmitting signals of a mobile communication system in accordance with another embodiment of the present invention.

FIG. 9 is a diagram illustrating a method for transmitting data of a mobile communication system in accordance with one embodiment of the present invention. Referring to FIG. 9, a first block 90, a second block 91 and a third block 92 are structurally similar to the first, second and third block of FIGS. 7 and 8. However, additional fields are depicted in FIG. 9.

A sequence number (SN) field indicates data flow of a corresponding RLC PDU or location information on a logical channel. A control/data/subframe (C/D/S) field indicates whether a corresponding RLC PDU is an ARQ RLC PDU for data transmission, an ARQ RLC control PDU for transmitting control information, or an ARQ RLC subPDU reconfigured when the ARQ RLC PDU is retransmitted.

A complete/partial (C/P) field indicates whether a first data part of the PDU is equal to a first part of an associated SDU. The C/P field also indicates which one of a plurality of SDUs corresponds to an end of the RLC PDU. An exemplary case, wherein the C/P field comprises two bits is as follows.

For example, if the value of the C/P field is "00", a beginning part of the PDU is equal to a beginning part of the SDU, and an end of the PDU is equal to an end of the SDU. If the value of the C/P field is "01", a beginning part of the PDU is equal to a beginning part of the SDU, and an end of the PDU is not equal to an end of the SDU. If the value of the C/P field is "10", a beginning part of the PDU is not equal to a beginning part of the SDU, and an end of the PDU is equal an end of the SDU. If the value of the C/P field is "11", a beginning part of the PDU is not equal to a beginning part of the SDU, and an end of the PDU is not equal to an end of the SDU.

A following (F) field indicates whether a next field is the LI field or data. The length indicator (LI) field indicates a boundary of an SDU contained in the PDU. A subframe Sequence Number (sSN) field indicates location information of a specific subPDU from among a plurality of associated subPDUs. A remaining (RM) field indicates the presence or absence of associated subPDUs after the specific subPDU.

As apparent from the above description, the present invention provides a method for transmitting data of a mobile communication system. If a specific data block is to be retransmitted but sufficient radio resources for transmitting the data block are not provided, the present invention reconfigures the data block in order to transmit the data block using the available radio resources. Preferably, the present invention retransmits only what is necessary. Therefore, data transmission efficiency is increased and service disconnection time of a user or UE is reduced.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The present invention can be applied to a mobile communication system.

What is claimed:

1. A method for retransmitting protocol data unit (PDU) in a mobile communication system, the method comprising:
generating a plurality of second PDUs for retransmission from a first PDU to be retransmitted if the first PDU does not fit within a size of PDU indicated by a lower layer, wherein each of the plurality of second PDUs fits within the size indicated by the lower layer, and
transmitting each second PDU to a receiving side,
wherein the generating of the plurality of second PDUs for retransmission comprises segmenting only the data field of the first PDU to form the at least one data field of each of the plurality of second PDUs, and setting the header of each of the plurality of second PDUs,
wherein the header of each of the plurality of second PDUs includes a field indicating that the respective second PDU is segmented from the first PDU.

2. The method of claim 1, wherein the header of each of the plurality of second PDUs includes a field indicating a sequence number of the first PDU.

3. The method of claim 1, wherein the header of each of the plurality of second PDUs includes a field indicating a position of a corresponding second PDU within the first PDU.

4. The method of claim 1, wherein the header of each of the plurality of second PDUs includes a field indicating whether a corresponding second PDU is a last segmented PDU within the first PDU or not.

5. The method of claim 1, wherein the first PDU is an Acknowledge Mode Data (AMD) PDU.

6. A user equipment for transmitting protocol data unit (PDU) in a mobile communication system, the user equipment comprising:
a transmitter; and
a processor operatively connected to the transmitter and configured to:
generate a plurality of second PDUs for retransmission from a first PDU to be retransmitted by segmenting only the data field of the first PDU to form the at least one data field of each of the plurality of second PDUs and setting the header of each of the plurality of second PDUs if the first PDU does not fit within a size of PDU indicated by a lower layer, wherein each of the plurality of second PDUs fits within the size indicated by the lower layer; and
transmit each second PDU to a network,
wherein the header of each of the plurality of second PDUs includes a field indicating that the respective second PDU is segmented from the first PDU.

7. The user equipment of claim 6, wherein the header of each of the plurality of second PDUs includes a field indicating a sequence number of the first PDU.

8. The user equipment of claim 6, wherein the header of each of the plurality of second PDUs includes a field indicating the position of a corresponding second PDU within the first PDU.

9. The user equipment of claim 6, wherein the header of each of the plurality of second PDUs includes a field indicating whether a corresponding second PDU is a last segmented PDU within the first PDU or not.

10. The user equipment of claim 6, wherein the first PDU is an Acknowledge Mode Data (AMD) Protocol Data Unit (PDU).

* * * * *